US009479739B2

(12) United States Patent
Lindquist et al.

(10) Patent No.: US 9,479,739 B2
(45) Date of Patent: Oct. 25, 2016

(54) METHODS AND APPARATUSES FOR ADAPTIVE CONTROL OF STREAMING

(75) Inventors: Jan Erik Lindquist, Älvsjö (SE); Torbjörn Einarsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1374 days.

(21) Appl. No.: 13/193,135

(22) Filed: Jul. 28, 2011

(65) Prior Publication Data

US 2012/0084454 A1 Apr. 5, 2012

Related U.S. Application Data

(60) Provisional application No. 61/389,586, filed on Oct. 4, 2010.

(51) Int. Cl.

| | |
|---|---|
| *G06F 15/173* | (2006.01) |
| *H04N 7/173* | (2011.01) |
| *H04N 21/61* | (2011.01) |
| *H04N 21/643* | (2011.01) |
| *H04N 21/845* | (2011.01) |
| *H04L 29/06* | (2006.01) |

(52) U.S. Cl.
CPC ...... *H04N 7/17318* (2013.01); *H04L 65/1083* (2013.01); *H04L 65/602* (2013.01); *H04L 65/608* (2013.01); *H04N 21/6125* (2013.01); *H04N 21/64322* (2013.01); *H04N 21/8456* (2013.01)

(58) Field of Classification Search
CPC .... H04L 65/60; H04L 65/602; H04L 65/608

USPC ......................................... 709/224, 227, 231
See application file for complete search history.

(56) References Cited

U.S. PATENT DOCUMENTS

| | | | |
|---|---|---|---|
| 8,473,628 B2 | 6/2013 | Kapoor et al. | |
| 2009/0006626 A1* | 1/2009 | Yamagishi | ..................... 709/226 |
| 2009/0298484 A1* | 12/2009 | White | ................... H04H 20/24 455/414.3 |
| 2011/0022705 A1* | 1/2011 | Yellamraju et al. | .......... 709/224 |

FOREIGN PATENT DOCUMENTS

| | | |
|---|---|---|
| CN | 101661504 A | 3/2010 |
| WO | 2010016836 A1 | 2/2010 |
| WO | 2010111261 A1 | 9/2010 |

OTHER PUBLICATIONS

International Search Report in corresponding PCT Application No. PCT/SE2011/050986 mailed Nov. 14, 2011.
Written Opinion of the International Searching Authority in corresponding PCT Application No. PCT/SE2011/050986 mailed Nov. 14, 2011.

(Continued)

*Primary Examiner* — Adnan Mirza
(74) *Attorney, Agent, or Firm* — Patent Portfolio Builders PLLC

(57) ABSTRACT

Apparatuses and methods used in a media streaming system in which at least two representations of a media content item are available are provided. An apparatus (500, 600) has a processor (504, 604) configured to generate signals when a change of representation and bandwidth is occurring in a sequence of segments of the media content item to be used by a streaming application.

18 Claims, 8 Drawing Sheets

(56) References Cited

OTHER PUBLICATIONS

"OIPF Release 2 Specification vol. 5—Declarative Application Environment [V2.0]—[Sep. 7, 2010"; pp. 1-60; retrieved from the Internet: URL:http://www.oipf.tv/live/oipf/docs/Release2/OIPF-T1-R2-Specification-Volume-5-Declarative-Application-Environment-v2_0-2010-09-07.pdf [retrieved on Oct. 17, 2011]; Velbonne, France; XP-002661614.

"OIPF Release 2 Specification HTTP Adaptive Streaming [V2.0]—Sep. 7, 2010]'"; URL:http://www.oipf.tv/live/oipf/docs/Release2/OIPF-T1-R2-Specification-Volume-2a-HTTP_Adaptive-Streaming-V2_0-2010-09-07.pdf [retrieved on Oct. 14, 2011];; pp. 1-25; Valbonne, France; XP055009601.

3GPP TS 26.247 V1.0.0.; 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10); pp. 1-35; Sep. 22, 2010; Valbonne, France; XP050442136.

3GPP, "3rd Generation Partnership Project; Technical Specification Group Services and System Aspects; Transparent end-to-end packet switched streaming service (PSS); 3GPP file format (3GP) (Release 10)," Technical Specification, 3GPP TS 26.244 v10.1.0, Jun. 2011, pp. 1-57.

3GPP, "3rd Generation Partnership Project; Technical Specification Group Services and System Aspects; Transparent end-to-end Packet-switched Streaming Service (PSS); Protocols and codecs (Release 10)," Technical Specification, 3GPP TS 26.234 v10.1.0, Jun. 2011, pp. 1-168.

3GPP, "3rd Generation Partnership Project; Technical Specification Group Services and System Aspects; IP Multimedia Subsystem (IMS); Stage 2 (Release 8)," Technical Specification, 3GPP TS 23.228 v8.4.0, Mar. 2008, pp. 1-234.

Cagenius, T., et al., "Evolving the TV experience: Anytime, anywhere, any device," Ericsson Review No. 3, 2006, pp. 107-111.

Cedervall, M., et al., "Open IPTV Forum—Toward an open IPTV standard," Ericsson Review No. 3, 2007, pp. 74-78.

Arberg, P., et al., "Network infrastructure for IPTV," Ericsson Review No. 3, 2007, pp. 79-83.

Olsson, U., et al., "Communication Services—The key to IMS service growth," Ericsson Review No. 1, 2008, pp. 8-13.

Noldus, R., et al., "Multi-access for the IMS network," Ericsson Review No. 2, 2008, pp. 81-86.

OIPF, "Release 2 Specification, vol. 5—Declarative Application Environment," Open IPTV Forum, v2.1, Jun. 21, 2011, pp. 1-369.

R. Oakley, Adding a simplified Smooth Streaming playback quality indicator to EE4 templates; downloaded from internet at [http://blogs.msdn.com/b/randyoakley/archive/2010/06/23/adding-a-simplified-smooth-streaming-playback-quality-indicator-to-ee4-templates.aspx] on Oct. 7, 2015; pp. 1-4.

Chinese O.A. in corresponding Chinese Application No. 201180047966.5 issued Sep. 30, 2015. (Reference WO 2010/111261A1 was submitted in an Information Disclosure Statement dated Jan. 3, 2012.).

Office Action mailed Jul. 28, 2014 in related EP Application No. 11 749 013.6. (References cited in this Office Action have previously been recorded with the USPTO).

* cited by examiner

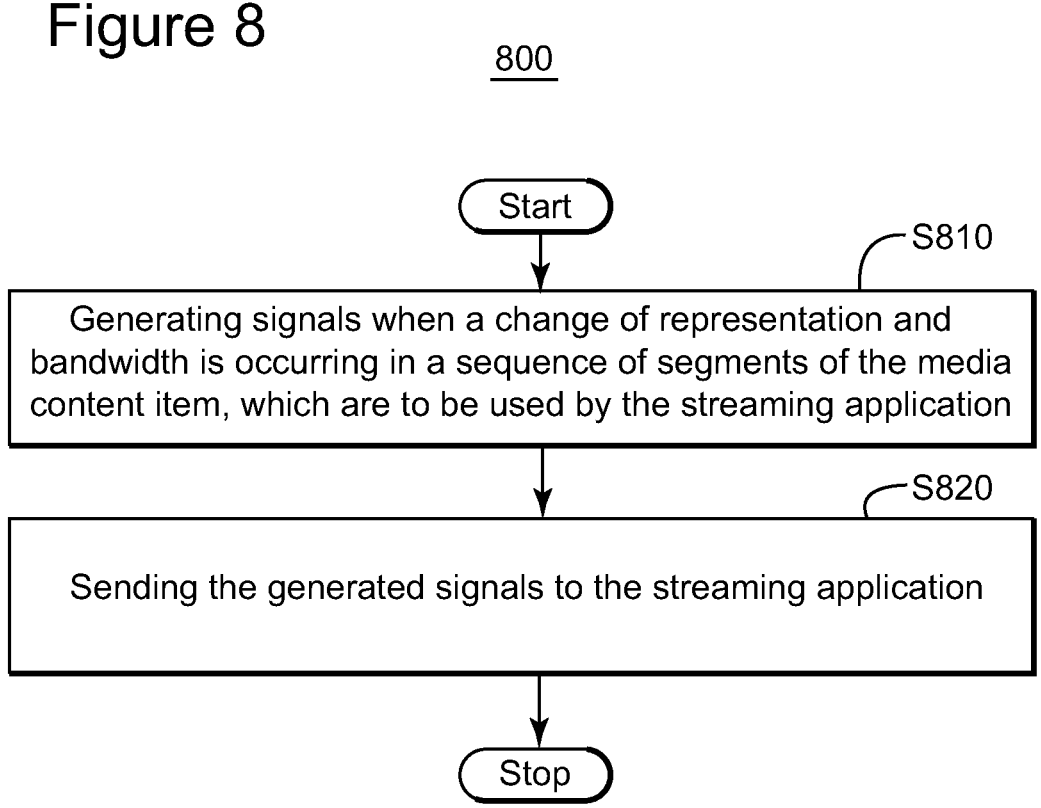

METHODS AND APPARATUSES FOR ADAPTIVE CONTROL OF STREAMING

This non-provisional patent application claims priority under 35 U.S.C. §119(e) from U.S. Provisional Application No. 61/389,586 filed on Oct. 4, 2010, the entire contents of which are hereby incorporated by reference into the present application.

TECHNICAL FIELD

The present invention generally relates to methods and apparatuses used for providing a client with information related to changes of representations of segments of streamed content.

BACKGROUND

The hypertext transfer protocol (HTTP) streaming of media, in particular video, has lately evolved beyond simple progressive download to allow adaptability and live content. In progressive download, which is currently the dominant manner in which video is consumed on the Internet, a client computer or software application downloads (fetches) a big file being assisted by a server and plays out the downloaded content in parallel with downloading. The HTTP streaming is based on splitting the media content (i.e., the file) into multiple segments, each corresponding to a small time interval of content (e.g., 10 seconds of playing out content). The client is provided with a manifest file containing a list of the segments and where from to download them (e.g., URL addresses), thus, enabling the client to download the segments one by one.

An example of HTTP streaming is Adaptive HTTP streaming that has been defined by the Third Generation Partnership Project (3GPP) in, for example, current versions of 3GPP Technical Specification (TS) 26.234 and 3GPP TS 26.244. A counterpart of 3GPP Adaptive HTTP streaming has been defined in the current version of Open Internet Protocol Television Forum (OIPF) in its version-2.0 specifications.

Underlying architecture of systems on which the above-specified protocols may be executed is defined, for example, as Internet Protocol (IP) Multimedia Subsystem (IMS) in 3GPP TS 23.228 V8.4.0, IP Multimedia Subsystem (IMS) Stage 2 (Release 8), March 2008, and other current versions of TS 23.228. IMS is described in, for example, R. Noldus et al., "Multi-Access for the IMS Network", *Ericsson Review* No. 2, pp. 81-86 (2008); U. Olsson et al., "Communication Services—The Key to IMS Service Growth", *Ericsson Review* No. 1, pp. 8-13 (2008); and P. Arberg et al., "Network Infrastructure for IPTV", *Ericsson Review* No. 3, pp. 79-83 (2007). Approaches to IMS-based IPTV are described in M. Cedervall et al., "Open IPTV Forum—Toward an Open IPTV Standard", *Ericsson Review* No. 3, pp. 74-78 (2007), and T. Cagenius et al., "Evolving the TV experience: Anytime, Anywhere, Any Device", *Ericsson Review* No. 3, pp. 107-111 (2006).

A user equipment (UE), such as a mobile phone, a set-top box (STB), a TV having STB capabilities, etc., can access services offered through an IMS in many ways, both wired (e.g., Ethernet, cable modem, digital subscriber line, etc.) and wireless (e.g., 3GPP-specified cellular radio, IEEE 802.11, IEEE 802.16, etc.). In general, IPTV is a term used for a system receiving and displaying multimedia streams encoded as series of IP data packets. An IPTV system and media bookmarks for such a system are described in International Publication WO 2010/016836 by N. Mitra et al.

In contrast to streaming servers based on protocols like the real-time streaming protocol (RTSP) and real-time transport protocol (RTP), in the IPTV methods of streaming content indicated above, a big content file is split into different segments/files that are downloaded via a standard web protocol (such as HTTP). This type of protocol is considered "cache-friendly", or Content Distribution Network (CDN) friendly, because no particular state in the server or cache is required. These methods enhance flexibility by allowing changes in the time intervals and segments. For example, an advertisement segment can be inserted by changing the content during one interval (which is called a "period" in the 3GPP specifications), and then returning to the regular content according to the manifest file in the next interval.

Adaptivity is also achieved by providing multiple versions (which are called "representations" in the 3GPP specifications) of the content for a time interval, so that the client can choose to download the version most suitable for the client's resources (given the network performance/download time) and preferences.

The media players discussed here may be either full-screen players, or may be embedded in an application, or in a browser, for example using the new HTML-5 video element. The application program interfaces (APIs) can be either native or Javascript APIs.

In the conventional systems, clients receive information from an interface comprising a set of functions and variables related to the downloading and the playing of the download media. In OIPF version 2, vol. 5, section 7.14.9, the following properties and methods are supported on audio and video objects as defined in Section 5.7.1 of the current version of CEA-2014-A.

--- function onReadyToPlay( )

The function that gets called when enough (as determined by the OITF)
of the media after the current play position has been buffered to
start/continue playback.
The specified function shall be called with no arguments.
This event SHALL be generated whenever there is a state transition
between state 4 ("buffering") and state 1 ("playing"). The event SHALL
also be generated at the moment that enough data has been buffered
to start playback, whilst in state 2 ("paused").

---

Here OITF is defined in the functional architecture specification as a block which resides inside a network offering IPTV services. OITF provides the functionality necessary to access the IPTV services in the network. In these definitions reproduced from the OIPF version 2, vol. 5, section 7.14.9, terms that are written with capital letters (e.g., "SHALL") are to be interpreted according to RFC 2119 "Key words for use in RFCs to Indicate Requirement Levels", published in March 1997 by the Internet Engineering Task Force (IETF) (which describes methods, behaviors, research, or innovations applicable to the working of the Internet and Internet-connected systems). Description of the properties and methods in OIPF version 2, vol. 5, section 7.14.9 continues below.

| Boolean readyToPlay |
| --- |
| Property that can be used to inspect whether or not enough (as determined by the OITF) of the media after the current play position has been buffered to start playback.<br>Returns true if enough data has been buffered. Returns false if not enough data has been buffered. |

| Integer getAvailablePlayTime(Boolean fromPlayPosition) | |
| --- | --- |
| Description | Returns how much content is available for playback.<br>If argument fromPlayPosition has value true, this method returns an estimate of how much data in milliseconds is available in the buffer for play back after the current play position.<br>If argument fromPlayPosition has value false, this method returns an estimate of the total buffer length in milliseconds (i.e. this includes all data available in the buffer before and after the current play position). |
| Arguments | fromPlayPosition Indicates whether the available play time should be calculated from the current play position onwards, or from the start of the buffer. |

| Boolean setBufferingStrategy(String name) | |
| --- | --- |
| Description | Request to change the buffering strategy. Valid values for argument name include:<br>"sustained_playback": this is the default strategy, whereby the incoming video stream should be rendered with as little hiccups or lost frames as possible. This means<br>that the buffering threshold for triggering an onReadyToPlay event is chosen to be sufficiently large to deal with variations in network throughput.<br>"low_latency": this is a strategy whereby the incoming video stream should be rendered with an as low as possible latency between receiving the content and the actual playback of the content. This means that buffering threshold for triggering an onReadyToPlay event needs to be made sufficiently small in order to playback the content as soon as possible after it has been received.<br>The default strategy if the method is not called is "sustained_playback".<br>This method can be called during any play state, including play state 1 ('playing').<br>This method returns true if the buffering strategy has been successfully changed to the preferred buffering strategy. The method returns false if the buffering strategy has not been successfully changed.<br>If the OITF does not distinguish between the two modes, the method returns false. |

Additionally, when the function onReadyToPlay is executed, a corresponding Document Object Model level 2 event SHALL (as defined in Worldwise Web Consortium—W3C—current documents) is generated in the following manner:

| Intrinsic event | Corresponding DOM 2 event | DOM 2 Event properties |
| --- | --- | --- |
| onReadyToPlay | ReadyToPlay | Bubbles: No<br>Cancelable: No<br>Context Info: None |

These DOM 2 events (as defined in W3C "Document Object Model (DOM) Level 2 events", version 1 from 2000) are directly dispatched to the event target, and will not bubble nor capture. Applications should not rely on receiving these events during the bubbling or the capturing phase. Applications that use DOM 2 event handlers SHALL call the addEventListener( )method (which described in current version of W3C, "Scalable Vector Graphics Tiny 1.2 Specification") on the CEA-2014 A/V Control object. The third parameter of addEventListener (i.e. "useCapture") is to be ignored.

Some media players using progressive download (e.g., a typical YouTube player) display a time line with a current play time point, and a progress bar with a buffering point showing how much content has been downloaded (i.e., buffered). The time line and the progress bar showing equivalent time may be overlapped. The media players typically begin to play the content after a predetermined amount of content has been downloaded and buffered. Then, the players continue downloading parallel with playing out the content. If the current play time point reaches the buffering point (i.e., all the downloaded content has been played), the playing is interrupted until enough content (e.g., a few seconds worth of played content) is downloaded and buffered. This situation, which is visually recognizable when the time line and the progress bar are displayed, is a well-known problem for the conventional media players.

Existing adaptive streaming solutions are designed to provide an interruption-free play-out experience, but the quality varies if the network capacity varies. These adaptive streaming solutions are often also used to replace progressive download for live content, such as, a sports event. Moreover, third-party applications for mobile devices use adaptive streaming solutions for all video content longer than a predetermined duration (e.g., 10 minutes) independently of whether the content is live or not.

Conventional multimedia players are not capable to provide streaming free of interruptions and at a constant quality. FIG. 1 is a graph illustrating the evolution of a played out bandwidth (i.e., bandwidth as a function of time) for a conventional system. Data is buffered only from a time t=0 until a moment marked as $t_1$ in FIG. 1. Multiple changes in the play-out bandwidth data and, thus, in the viewing quality occur at $t_2$, $t_3$, $t_4$, etc.

However, especially for video-on-demand, the end-user (viewer) or the application developer may still want to have the progressive-download user experience, where the quality is not varying, but the data is instead buffered longer.

Additionally, the end-user/developer may also want (and the conventional multimedia players do not provide for) to be able to set an upper limit on the bit-rate (bandwidth), especially when the end-user pays traffic charges depending on the traffic amount.

Another desirable feature, which is not provided by the conventional media players, is providing an indication of the current media quality (bandwidth or bit-rate). For example, presence of a bit-rate (or bandwidth) meter overlaying the content and showing the current bit-rate (or bandwidth) and its evolution would enable the end-user to understand when the variations in quality are due to network variations, and when are due to inherent problems in the media player, or on the server. Information and control related to downloading and/or playing out would lead to a more consistent user experience, which is very important especially for paid services.

Accordingly, it would be desirable to provide methods and devices that overcome the afore-described problems and drawbacks of the conventional media players.

SUMMARY

It is an object to overcome some of the deficiencies discussed in the previous section and to provide an apparatus incorporated in a media player or a download manager (i.e., control server) enabling control of bandwidth, and thereby quality, or a bandwidth/quality range in streaming a media content item which is available in at least two representations in the media streaming system. This makes it possible to use adaptive streaming solutions to replace progressive download. By generating signals (i.e., providing events) when the bandwidth/quality of the segments used in streaming changes, it is possible to give an end-user a more consistent viewing experience.

According to one exemplary embodiment, there is an apparatus used in a media streaming system in which at least two representations of a media content item are available includes a processor configured to generate signals when a change of representation and bandwidth is occurring in a sequence of segments of the media content item to be used by a streaming application.

According to another exemplary embodiment, a method executed by a processor in communication with a streaming application in a streaming system in which at least two representations of a media content item are available is provided. The method includes generating signals when a change of representation and bandwidth is occurring in a sequence of segments of the media content item, which are to be used by the streaming application. The method further includes sending the generated signals to the streaming application.

According to another exemplary embodiment, computer readable medium non-transiently storing executable codes which when executed by a processor make the processor to execute a method is provided. The method includes generating signals when a change of representation and bandwidth is occurring in a sequence of segments of the media content item, which are to be used by the streaming application. The method further includes sending the generated signals to the streaming application.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flow diagram of a method for providing information related to streaming media according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of systems for streaming media. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 2:
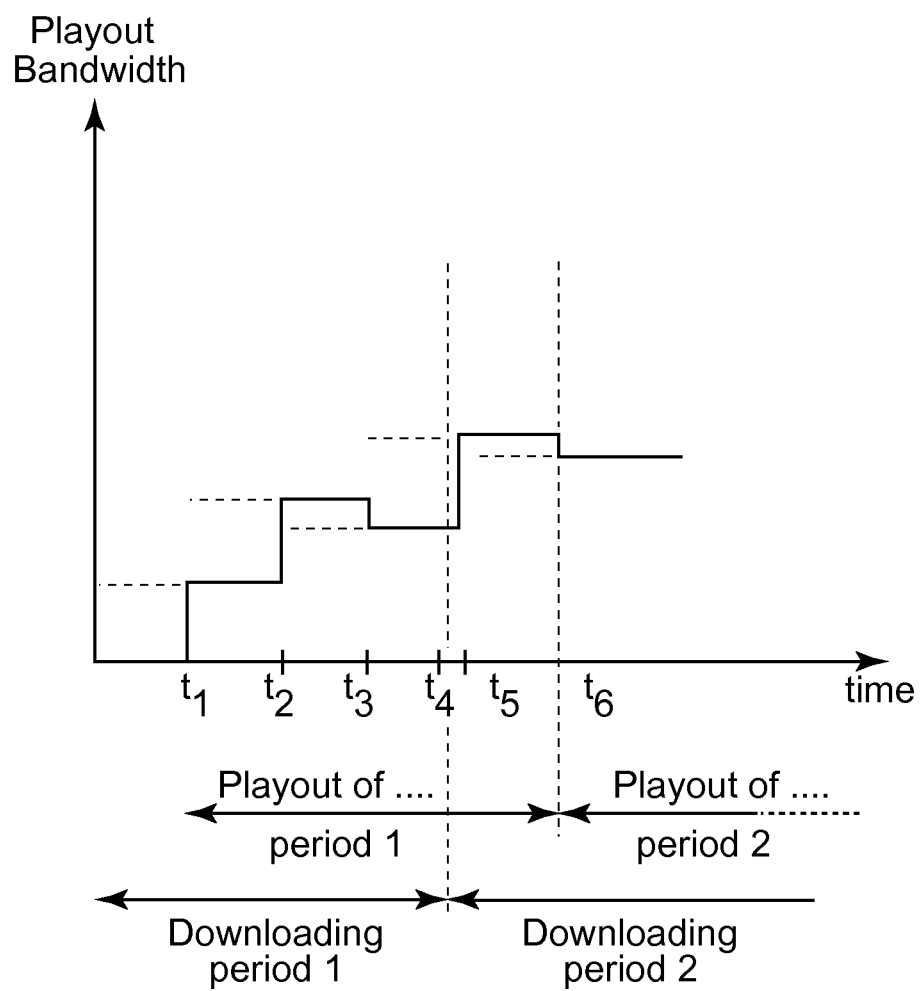
FIG. 2 is a graph illustrating evolution of bit-rate or bandwidth used for downloading and buffering and playing out streamed content.

For purposes of illustration and not of limitation FIG. 2 is a graph representing bit-rate or bandwidth evolution (i.e., as a function of time) for an adaptive HTTP streaming session. The streaming session includes two periods, Period 1 and Period 2, each period having multiple segments. A break for rebuffering may occur only between periods. Data is first downloaded and buffered (the dotted line 100) and are then played out (the solid line 200). A period typically has multiple segments.

Period 1 is downloaded and buffered from t=0 (beginning of the plotted time interval) until $t=t_4$ in FIG. 2. Period 2 is downloaded and buffered to the media player starting from the moment $t_4$. Period 1 is played between $t_1$ and $t_6$, while Period 2 is played starting from $t_6$. Thus, data is only downloaded and buffered until $t_1$. After $t_1$ playing of Period 1 begins while downloading and buffering of the data to be played continues. If the bandwidth used for downloading is smaller than the bandwidth used for playing (e.g., between $t_2$ and $t_3$ and between $t_5$ and $t_6$), a distance (in time, e.g., on overlaid playing time bar and download progress bar) between the played out point and the buffering point decreases. Conversely, when the bandwidth used for downloading is larger than the bandwidth used for playing (e.g., between $t_1$ and $t_2$ and between $t_3$ and $t_5$), the distance between the played out point and the downloading point increases.

Each period includes a plurality of segments corresponding to different time intervals, which may have different bandwidths and correspond to different Representations. Available Representations for the same segment may differ in terms of one or more characteristics. For example, Representations may have different bandwidths or may correspond to different languages (English, Chinese, etc.). Which of the Representations becomes part of the presentation (i.e., is downloaded and played out) may be determined based on client's preferences (e.g., in terms of bandwidth or language).

In FIG. 2, the dotted lines illustrate bandwidths of the content as it is downloaded, and the solid lines illustrate bandwidths of the content as it is played out. There are four different bandwidths in Period 1 (which may correspond to different segments although neighboring segments may also use the same bandwidth) and two different bandwidths in Period 2.

Relative to FIG. 2, an apparatus according to an embodiment, which may be incorporated in an IPTV application platform, in a control server for providing media program content or may be a separate hardware entity, signals bandwidth changes events at $t_1$, $t_2$, $t_3$, $t_5$, $t_6$, and/or a Period 2 downloading start at $t_4$, to the media player (or to the streaming application running on the IPTV application platform).

Figure 3:
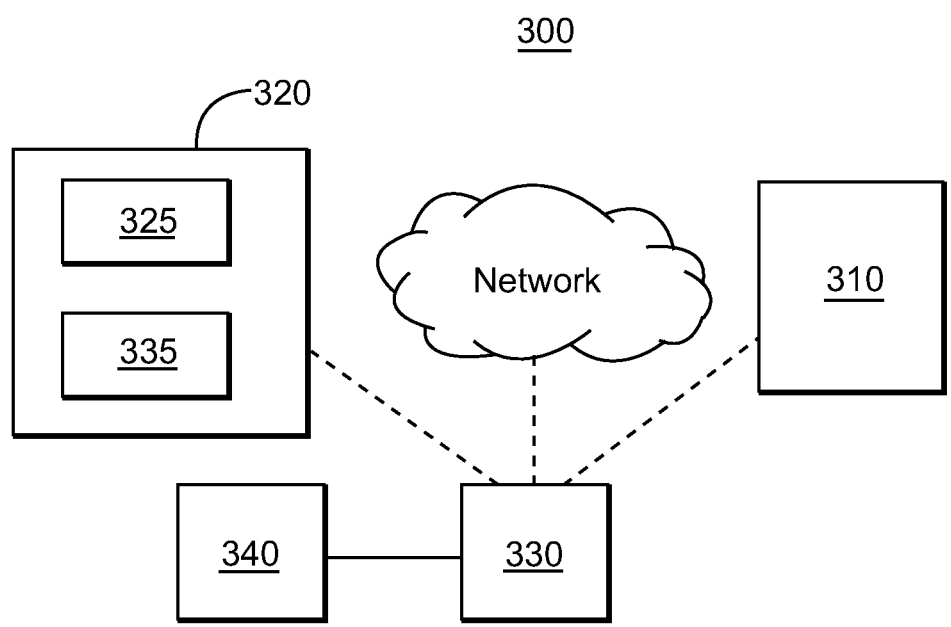
FIG. 3 illustrates the structure of a media streaming system according to an exemplary embodiment.

FIG. 3 illustrates the structure of a media streaming system 300 according to an exemplary embodiment. The system 300 includes a control server 310 configured to manage downloading data (i.e., media content) via wire or wirelessly to a media player 320. For example, the control server 310 may prepare the manifest file. The data may be buffered in a buffer 335 and may be played out by a media streaming application 325 executed on the media player 320. An apparatus 330 is configured to synthesize information related to bandwidth of the streamed data and communicate the information to the media streaming application 325. The apparatus 330, which may be software or a combination of software and hardware, may be incorporated in the media player 320, in the control server 310 or may be a standalone device used for streaming the data via a network that may be Internet. Further, the apparatus 330 include or be connected to a memory non-transiently storing programs (i.e., executable codes) that may be retrieved by the apparatus and may trigger the apparatus 330 to synthesize information related to bandwidth of the streamed data and communicate the information to the media streaming application 325.

Figure 1:
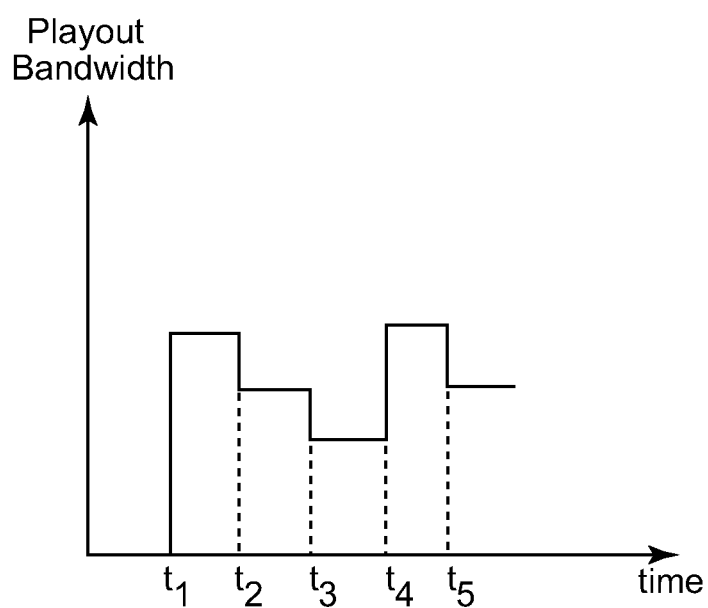
FIG. 1 is a graph illustrating evolution of bandwidth used for playing out streamed content in a conventional adaptive streaming player.
Figure 4:
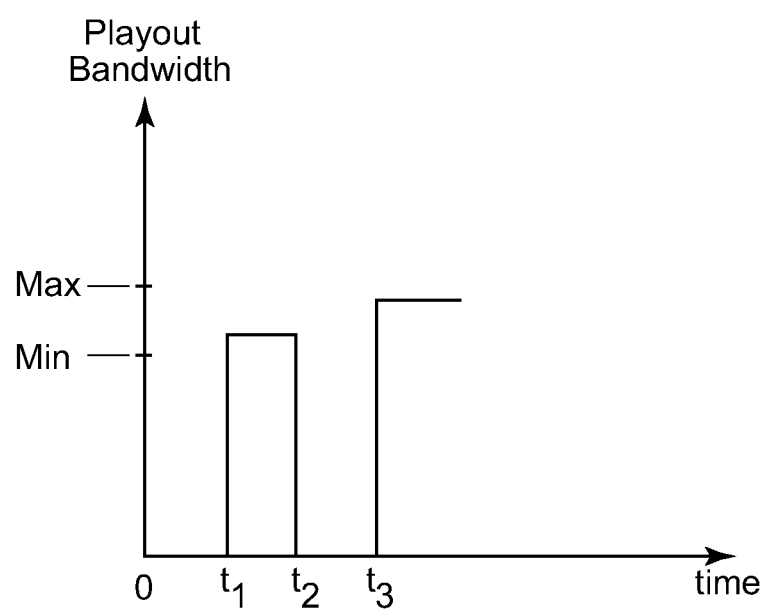
FIG. 4 is a graph illustrating evolution of a played out bandwidth (i.e., bandwidth as a function of time) for a media player according to an exemplary embodiment.

According to another embodiment, an apparatus (e.g., 330 in FIG. 3) may enable the client to communicate a minimum bandwidth parameter and a maximum bandwidth parameter. FIG. 4 is a graph illustrating evolution of a played out bandwidth (i.e., bandwidth as a function of time) for a media player according to an embodiment, which media player operates according to the minimum bandwidth parameter and the maximum bandwidth parameter received from the client. In contrast to the situation in FIG. 1, here a constant play-out behavior (i.e., the play out bandwidth within a narrow range between min and max) may be achieved. Interruptions for re-buffering (e.g., between $t_2$ and $t_3$) may occur when the available bandwidth is outside the minimum/maximum range. However, these re-buffering interruptions may be avoided by having a longer initial buffering period (e.g., between 0 and $t_1$). In the use case of a local recording or when data is downloaded for later use, the ability to control quality can be more important than a short initial buffering period.

Thus, embodiments of media players or download managers according to various embodiments make it possible to enhance consistency of the end user's viewing experience, by generating and using information related to bandwidth/quality changes, and/or by configuring playing out within a specific bandwidth. These methods and apparatuses may be used in many types of electronic communication such as mobile radio networks.

Figure 5:
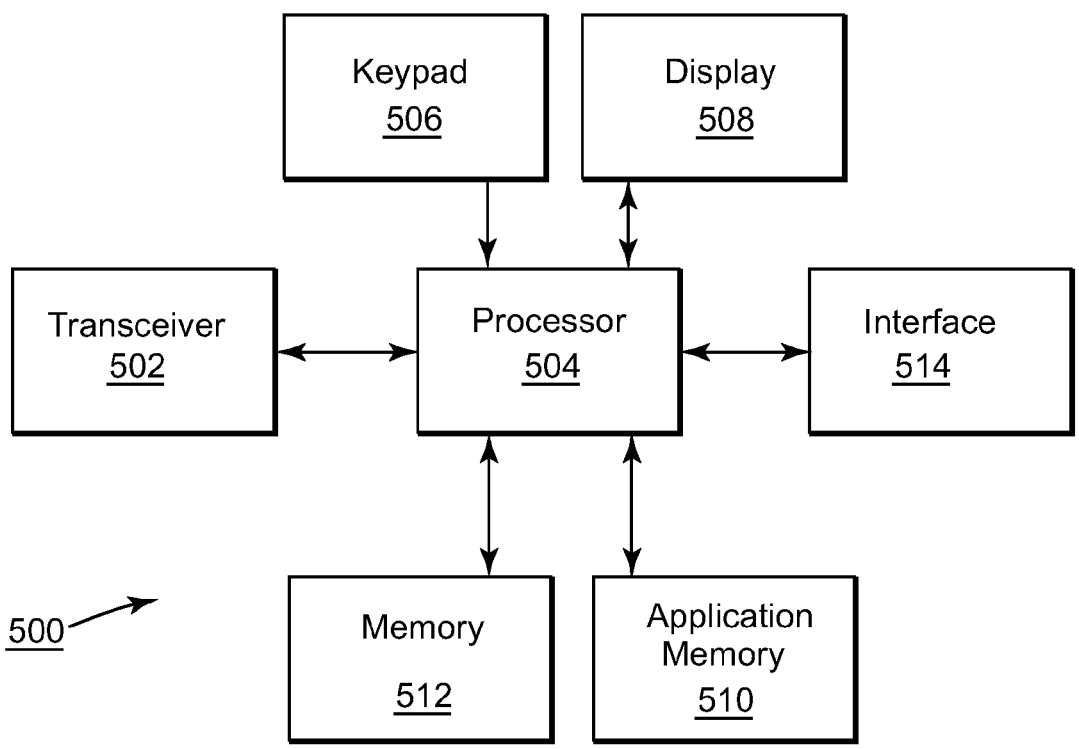
FIG. 5 is a block diagram of an user equipment according to an exemplary embodiment.

For purposes of illustration and not of limitation, FIG. 5 is a block diagram of an user equipment (UE) 500, such as a mobile phone, set-top box (STB), computer, etc., executing methods related to adaptive media streaming according to various embodiments. The UE 500 includes a transceiver 502 that is suitable for exchanging electronic signals with one or more of the IPTV network entities. Information carried by those signals is handled by a processor 504, which may include one or more sub-processors, and which executes one or more software modules and applications, including for example the browser and IPTV terminal function (ITF), to carry out the operations of the UE 500 described above. User input to the UE 500 is provided through a keypad, remote control, or other device 506, and information presented to the user is provided to a display 508. If the display has touch-screen capabilities, user input can be provided through the display. Software applications may be stored in a suitable application memory 510, and the UE may also download and/or cache desired information in a suitable memory 512. The UE 500 may also include an interface 514 that can be used to connect other components, such as a computer, microphone, etc., to the UE 500. Based on running executable codes, the processor 504 forms the appropriate request and response messages and sends them to the network via transceiver 502, and acts on messages and information received from the network. Such activity can include the methods described above.

Figure 6:
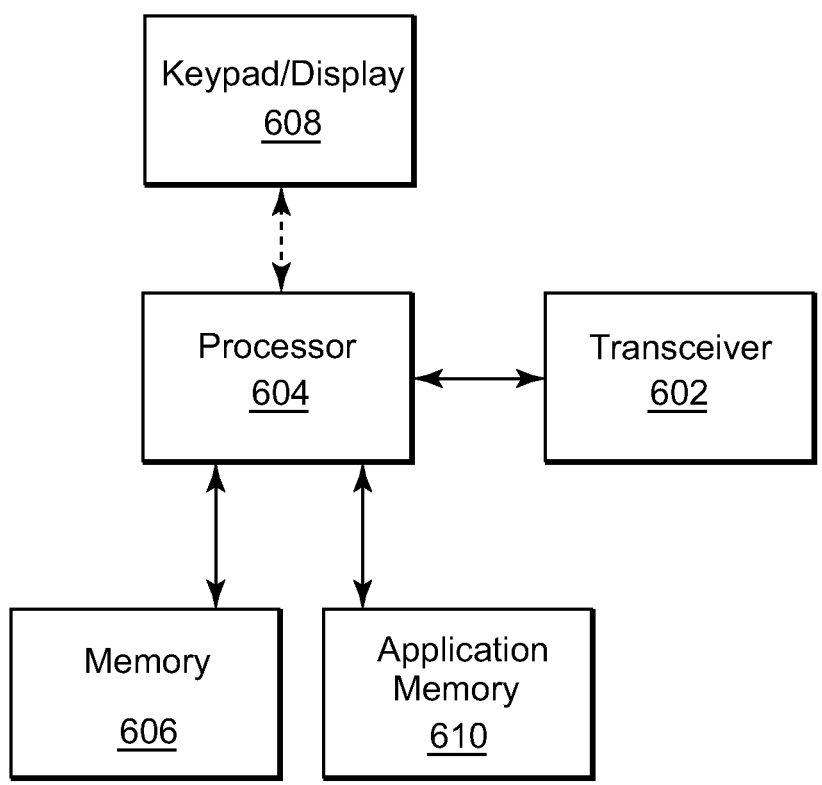
FIG. 6 is a block diagram of an IPTV Application Platform (IAP) or a control server for providing media program content according to an exemplary embodiment.

FIG. 6 is a block diagram of an IPTV Application Platform (IAP) 600 or a control server for providing media program content according to an exemplary embodiment. The IAP 600 includes a transceiver 602 that is suitable for exchanging electronic signals with one or more IPTV network entities. Information carried by those signals is handled by a processor 604, which may include one or more sub-processors, and which executes in cooperation with a suitable memory 606 one or more software modules and applications to carry out the operations of the IAP 600. The IAP 600 is configured to operate as a database server in the network. A keypad/display 608 is usually not needed for user input/output, although such interfaces may be provided for administrative functions. Software applications executed by the processor 604 may be stored in a suitable application memory 610.

The methods according to various embodiments may be implemented as additions to and operating within the same environment as functions, methods and events related to downloading and playing media content, as defined in OIPF version 2, vol. 5, section 7.14.9. The HTTP adaptive streaming provides for scripts (e.g., Declarative Application Environment—DAE—application) executed by a terminal executing a streaming application (e.g., an IPTV Application Platform) or a control server to synthesize information related to bandwidth changes associated with transition from a segment of the media content as downloaded or as played to a next segment downloaded or played. The Declarative Application Environment (DAE) application conveys this information to the end user. The added procedures enable:
    to list of the available play out qualities (once streaming is initiated),
    to monitor current quality and speed (bitrate, bandwidth) during streaming,
    to monitor events when the quality changes based on change in presentation, and to lock quality in a particular level, if shifting occurring too often.

Figure 7:
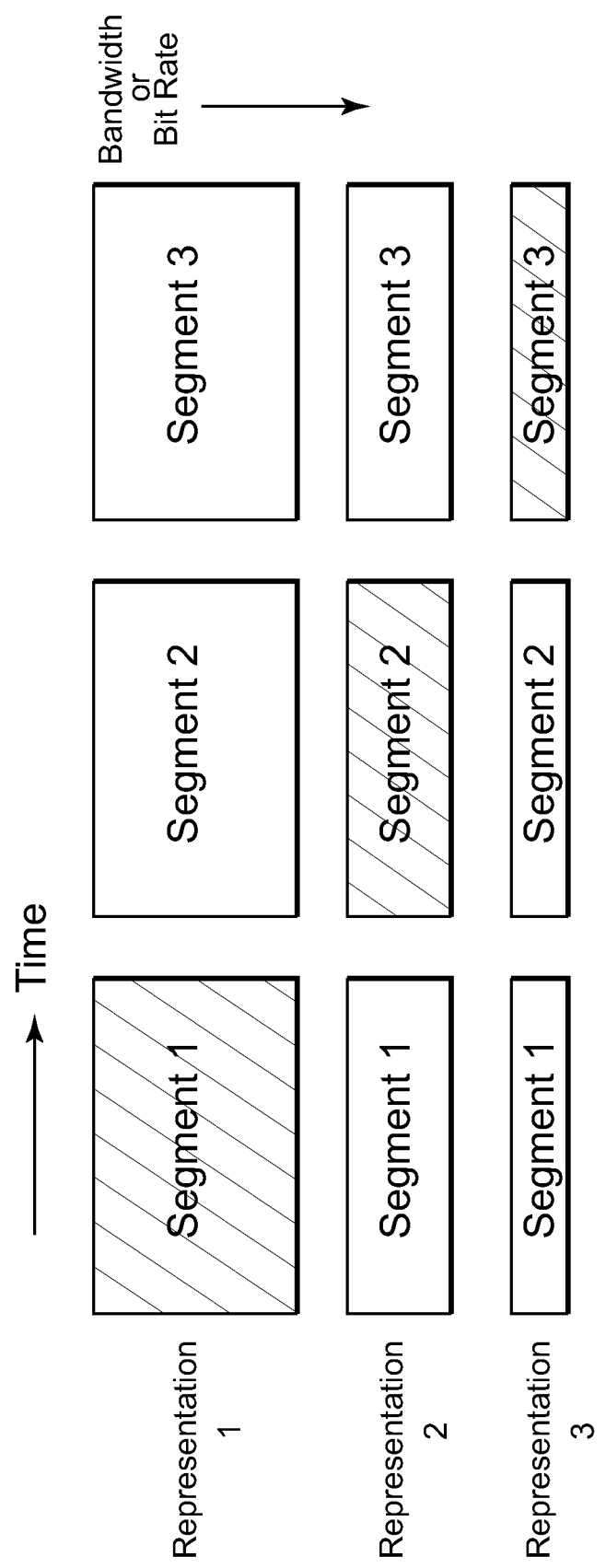
FIG. 7 is an illustration of different representations stored in a media streaming system.

In a media streaming system, multiple representations of a media content item may be available. The representations are divided into temporally aligned and independently encoded segments having different bitrates (or bandwidth) as illustrated in FIG. 7, and may be stored in different locations. At least one segment is downloaded for each time segment to be made available to a streaming application. For example, Segment 1 of Representation 1, Segment 2 of Representation 2, and Segment 3 of Representation 3 may be used (i.e., presented or played out) by the streaming application. The streaming application uses (e.g., plays out) segments of the media content item in a temporal sequence, but neighboring segments may belong to different representations. The segments may be used in groups named periods, each period including one or more downloaded segments.

According to an exemplary embodiment, an apparatus (such as, 500 in FIG. 5 or 600 in FIG. 6) used in a media streaming system (such as, 300 in FIG. 3) has a processor (such as 504 in FIG. 5 or 604 in FIG. 6) configured to generate signals when a change of representation is occurring in a sequence of segments of the media content item to be used (e.g., played out) by a streaming application. The apparatus may be included in the media player 320 and the streaming application may run on the processor or on another processor therein. However, the apparatus may also be part of the control server 310 or may be located in an intermediary node.

The processor may be configured to execute a (first) function signaling a change of bandwidth associated with a new segment to be used, the new segment corresponding to a different representation of the content than a preceding segment. This function may have as arguments a new bandwidth of the new segment and a position at which the new segment is to be used. For example, looking back to FIG. 2 such a function may be executed at $t_1$, $t_2$, $t_3$, $t_5$, $t_6$.

In an embodiment, the above-described function may be an extension of OIPF version 2, vol. 5, section 7.14.9 being supported on audio and video objects as defined in Section 5.7.1 of CEA-2014-A.

| function onRepresentationchange( ) |
|---|
| The function that gets called when the stream changes representation and the bandwidth is modified. The bandwidth relates to the bandwidth attribute in the representation element of HTTP Adaptive Streaming manifest.<br>The stream change relates to presentation changes and not necessarily how the stream is buffered. Note that multiple streams representing |

| function onRepresentationchange( ) |
|---|
| different qualities may be buffered and therefore is unreliable to indicate bandwidth change.<br>The specified function is called with two arguments bandwidth and position which are defined as follows:<br>String bandwidth—the bandwidth associated with the new representation.<br>String position—the position in which the transition occurs to a new representation.<br>The value shall be equivalent to playPosition property. |

Further, the processor may be configured to execute another (second) function signaling a change of bandwidth, associated with (1) a new segment to be used, the new segment corresponding to a different representation of the content than a preceding segment, and (2) a new period, a period being a sequence of downloaded segments to be used together as a use segment. The second function may be executed immediately after a new list of downloaded segments to be used as the new period is received. For example, looking back to FIG. 2 such a function may be executed after $t_4$. This function may have as arguments (1) a list of bandwidths associated with the segments of the new period and (2) position at which the new segment is to be used.

In an embodiment, the above-described function may be an extension of OIPF version 2, vol. 5, section 7.14.9 being supported on audio and video objects as defined in Section 5.7.1 of CEA-2014-A.

| function onPeriodchange( ) |
|---|
| The function that gets called when the period changes and the representation and associated bandwidths are modified. The bandwidth relates to the bandwidth attribute in the representation element of HTTP Adaptive Streaming manifest.<br>The function is called immediately when the new manifest is downloaded by the OITF prior to buffering of the stream and changes in presentation. When the function is called it is possible to modify the selected max and min representation.<br>The specified function is called with two arguments bandwidths and position which are defined as follows:<br>String bandwidths—the list of bandwidths associated with the new period for a new representation .<br>String position—the position in which the transition to a new representation shall occur. |

There is a significant difference between the second function (that may be embodied as OnPeriodChange) and the previously-described first function (that may be embodied as OnRepresentatioChange): while the first function (e.g., OnRepresentatioChange) refers to segments about to be presented, the second function (e.g., OnRepresentatioChange) is prior to the segments being buffered. The first function may be executed in a situation in which a segment was downloaded, but the buffer (period) has not been filled, and prior to the player presenting (e.g., playing) the already downloaded segment. Upon the first command being executed, the player starts downloading the segment with a different (e.g., lower) resolution, which results in the player having two versions of the same segment buffered. In contrast, the second function may have a positive effect because it may result in saving resources for downloading and streaming the segment.

The processor may also be configured to execute a procedure to provide an ordered list of bandwidths corresponding to available alternative representations of the media content item. In an embodiment, the above-described function may be an extension of OIPF version 2, vol. 5, section 7.14.9 being supported on audio and video objects as defined in Section 5.7.1 of CEA-2014-A.

| Readonly Number availableRepresentations[ ] |
| --- |
| Returns the ordered list of bandwidths according to the bandwidth attribute in the representation element of HTTP Adaptive Streaming. |

The processor may also be configured to execute a procedure to provide a bandwidth for a selected representation that is being used. In an embodiment, the above-described procedure may be an extension of OIPF version 2, vol. 5, section 7.14.9 being supported on audio and video objects as defined in Section 5.7.1 of CEA-2014-A.

| Readonly Integer currentRepresentation |
| --- |
| Returns the current bandwidth for the selected representation in HTTP Adaptive Streaming that is being presented. The bandwidth is only available in playing state 1 ('playing'), in other states the value is undefined.<br>In order to get the current speed refer to property playSpeed. |

The processor may also be configured to execute procedures returning maximum or minimum bandwidth for a currently used representation. In some embodiments, the above-described procedures may be extensions of OIPF version 2, vol. 5, section 7.14.9 being supported on audio and video objects as defined in Section 5.7.1 of CEA-2014-A.

| Readonly Integer maxRepresentation |
| --- |
| Returns the set maximum bandwidth for the selected representation in HTTP Adaptive Streaming that is being presented. |

| Readonly Integer minRepresentation |
| --- |
| Returns the set minimum bandwidth for the selected representation in HTTP Adaptive Streaming that is being presented. |

The processor may be configured to execute a procedure returning a Boolean value, to request (i.e., potentially trigger) a change of a current presentation strategy. The procedure requests only representations that remain between a maximum allowed bandwidth and a minimum allowed bandwidth (which are arguments of the procedure) to be used. If the change of the current presentation strategy is successful, the returned Boolean value is "true". If the maximum allowed bandwidth is not larger than the minimum allowed bandwidth, the returned Boolean variable is "false." If none of the available representations is in a range between the minimum allowed bandwidth and the maximum allowed bandwidth, the returned Boolean variable is "false." In order to determine whether any of the available representation is in the bandwidth range, the processor may use the procedure returning the ordered list of bandwidths corresponding to available alternative representations. This procedure may be executed at any time, regardless of a status of streaming (e.g., buffering, on-going use or playing, interrupted, etc.). In an embodiment, the above-described procedure may be an extension of OIPF version 2, vol. 5, section 7.14.9, being supported on audio and video objects as defined in Section 5.7.1 of CEA-2014-A.

| | Boolean setRepresentationstrategy(Integer maxBandwidth, Integer minBandwidth) | |
| --- | --- | --- |
| Description | Request to change the HTTP Adaptive Streaming presentation strategy for the available representation. The indicated bandwidth represents the maximum and minimum bandwidth to be allowed. Representations outside of the upper and lower limits are restricted.<br>This method can be called during any play state, including play state 1 ('playing').<br>This method returns true if the strategy has been successfully changed. The method returns false if the buffering strategy has not been successfully changed.<br>The value of maxBandwidth shall be greater than minBandwidth otherwise the method shall return false. The range between the bandwidth from maxBandwidth and minBandwidth shall allow for at least one of the values from property availableRepresentations otherwise the method shall return false.<br>If the HAS period changes and a new representation with new available representations are not within the set representation strategy the strategy the max and<br>min bandwidth are reset to undefined. In order to avoid this from occurring the max and/or min bandwidth have to be immediately be modified when onPeriodChange function is called. | |
| Arguments | maxBandwidth | The maximum bandwidth allowed for the presentation of HAS. If value set to undefined the limit is set by the OITF. |
| | minBandwidth | The minimum bandwidth allowed for the presentation of HAS. If value set to undefined the limit is set by the OITF. |

If one of the arguments, maxBandwidth or minBandwidth is not specified it means that no respective maximum or minimum bandwidth limit is applied.

Additionally, in the context of OIPF and CEA-2014-A, for the intrinsic event below, a corresponding DOM level 2 event SHALL is generated in the following manner:

| Intrinsic event | Corresponding DOM 2 event | DOM 2 Event properties |
| --- | --- | --- |
| onRepresentationChange | RepresentationChange | Bubbles: No<br>Cancelable: No<br>Context Info: None |

| Intrinsic event | Corresponding DOM 2 event | DOM 2 Event properties |
|---|---|---|
| onPeriodChange | PeriodChange | Bubbles: No<br>Cancelable: No<br>Context Info: None |

These DOM 2 events are directly dispatched to the event target, and will not bubble nor capture. Applications should not rely on receiving these events during the bubbling or the capturing phase.

FIG. 8 is a flow diagram of a method 800 which may be executed by a processor (such as, 504 in FIG. 5 or 604 in FIG. 6) which is part of an apparatus (such as, 504 in FIG. 5 or 604 in FIG. 6, that may correspond to 330 in FIG. 3) and in communication with a streaming application (such as, 325 in FIG. 3) in a streaming system (such as, 300 in FIG. 3). In the streaming system, at least two representations of a media content item are available. The method 800 includes generating signals when a change of representation and bandwidth is occurring in a sequence of segments of the media content item, which are to be used by the streaming application, at S810. The method 800 further includes sending the generated signals to the streaming application, at S820. The method may be stored in a computer readable medium (340), as programs executable by processor.

The disclosed exemplary embodiments provide methods and apparatuses for providing a streaming client with information pertinent to strategic decisions related to streaming content. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in wireless communication devices, methods or in a computer program product. Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. An apparatus used in a media streaming system in which at least two representations of a media content item are available, the apparatus comprising:
a processor configured
to generate a signal by executing a function when a change of representation and bandwidth is occurring in a sequence of segments that form a new period being played together as a played out segment by a streaming application, the signal indicating that a new segment in the new period has a different representation than a preceding segment,
wherein a first argument of the function is a list of bandwidths associated with the segments of the new period, and a second argument of the function indicates a position at which the new segment is to be played.

2. The apparatus of claim 1, wherein the processor is configured to execute another function signaling a change of bandwidth associated with the new segment to be used by the streaming application, a first argument of the other function being a new bandwidth of the new segment, and a second argument of the function being a position at which the new segment is to be used.

3. The apparatus of claim 2, wherein the processor is further configured to generate an event, when the other function is executed.

4. The apparatus of claim 1, wherein the processor is configured to execute the function immediately after receiving a new list of downloaded segments to be played as the new period.

5. The apparatus of claim 1, wherein the processor is further configured to generate an event, when the function is executed.

6. The apparatus of claim 1, wherein the processor is further configured to provide an ordered list of bandwidths corresponding to available alternative representations of the content.

7. The apparatus of claim 1, wherein the processor is further configured to provide, while playing, a bandwidth for a selected representation that is being presented.

8. The apparatus of claim 1, wherein the processor is further configured to provide a maximum bandwidth for a representation that is being presented.

9. The apparatus of claim 1, wherein the processor is further configured to provide a set minimum bandwidth for a representation that is being presented.

10. The apparatus of claim 1, wherein the processor is further configured to execute a procedure returning a Boolean value to request of a change of a current presentation strategy.

11. The apparatus of claim 10, wherein the returned Boolean value is "true" if the change of the current presentation strategy is successful.

12. The apparatus of claim 10, wherein a first argument of the procedure is a maximum allowed bandwidth and a second argument is a minimum allowed bandwidth, the request limiting available representations to representations that remain between the maximum allowed bandwidth and the minimum allowed bandwidth.

13. The apparatus of claim 12, wherein if the maximum allowed bandwidth is not larger than the minimum allowed bandwidth, the returned Boolean variable is "false".

14. The apparatus of claim 12, wherein the processor is further configured to provide an ordered list of bandwidths corresponding to available alternative representations of the content, and
if none of the available representations is in a range between the minimum allowed bandwidth and the maximum allowed bandwidth, the returned Boolean variable is "false".

15. The apparatus of claim 12, wherein the first argument or the second argument of the procedure is not specified, the request limits the available representations to representations that are above the minimum allowed bandwidth or below the maximum allowed bandwidth, respectively.

16. The apparatus of claim 1, wherein the processor is configured to operate in an environment as defined by October 2010 version 2 of OIPF documents.

17. A method executed by a processor in communication with a streaming application in a streaming system in which at least two representations of a media content item are available, the method comprising:
- generating a signal by executing a function when a change of representation and bandwidth is occurring in a sequence of segments that form a new period being played together by the streaming application, the signal indicating that a new segment in the period has a different representation than a preceding segment; and
- sending the signal to the streaming application,
- wherein a first argument of the function is a list of bandwidths associated with the segments of the new period, and a second argument of the function indicates a position at which the new segment is to be played.

18. A non-transitory computer readable medium storing executable codes which, when executed by a processor, make the processor to execute a method comprising:
- generating a signal by executing a function when a change of representation and bandwidth is occurring in a sequence of segments that form a new period being played together by the streaming application, the signal indicating that a new segment in the period has a different representation than a preceding segment; and
- sending the signal to the streaming application,
- wherein a first argument of the function is a list of bandwidths associated with the segments of the new period, and a second argument of the function indicates a position at which the new segment is to be played.

\* \* \* \* \*